(12) United States Patent
Fuss et al.

(10) Patent No.: US 6,786,022 B2
(45) Date of Patent: Sep. 7, 2004

(54) SYSTEM, METHOD AND MATERIAL FOR MAKING PNEUMATICALLY FILLED PACKING CUSHIONS

(75) Inventors: Gunter G. Fuss, San Mateo, CA (US); Vladimir Yampolsky, San Carlos, CA (US)

(73) Assignee: Free-Flow Packaging International, Inc., Redwood City, CA (US)

( * ) Notice: Subject to any disclaimer, the term of this patent is extended or adjusted under 35 U.S.C. 154(b) by 0 days.

(21) Appl. No.: 10/323,479

(22) Filed: Dec. 18, 2002

(65) Prior Publication Data

US 2003/0089082 A1 May 15, 2003

Related U.S. Application Data

(60) Division of application No. 09/765,064, filed on Jan. 17, 2001, now Pat. No. 6,582,800, and a continuation-in-part of application No. 09/488,622, filed on Jan. 20, 2000, now abandoned.

(51) Int. Cl.[7] .............................................. B65B 31/06
(52) U.S. Cl. ............................ 53/403; 53/432; 53/473; 53/512
(58) Field of Search ................................ 53/384.1, 403, 53/432, 433, 473, 474, 512, 434; 156/145.147, 272, 210, 285, 292, 322, 494, 499, 553

(56) References Cited

U.S. PATENT DOCUMENTS

| | | |
|---|---|---|
| 3,660,189 A | 5/1972 | Constantine |
| 3,674,614 A | 7/1972 | Templeton |
| 3,868,285 A | 2/1975 | Troy |
| 3,914,917 A * | 10/1975 | Young .......................... 53/434 |
| 4,016,026 A * | 4/1977 | Grevich ...................... 156/555 |
| 4,017,351 A | 4/1977 | Larson et al. |
| 4,021,283 A * | 5/1977 | Weikert .................. 156/244.14 |
| 4,169,002 A | 9/1979 | Larson |
| 4,586,319 A | 5/1986 | Ausnit |
| 4,680,073 A | 7/1987 | Brunner et al. |
| 4,981,006 A | 1/1991 | Caenazzo et al. |
| 5,046,258 A | 9/1991 | Cahill et al. |
| 5,187,917 A * | 2/1993 | Mykleby ...................... 53/434 |
| 5,216,868 A | 6/1993 | Cooper et al. |
| 5,427,830 A | 6/1995 | Pharo |

(List continued on next page.)

FOREIGN PATENT DOCUMENTS

| | | |
|---|---|---|
| DE | 29717551 | 3/1998 |
| DE | 19913408 | 10/2000 |

(List continued on next page.)

Primary Examiner—Scott A. Smith
Assistant Examiner—Hermant M. Desai
(74) Attorney, Agent, or Firm—Edward S. Wright

(57) ABSTRACT

System, method and material for making pneumatically filled packing cushions in which a plastic film material having two superposed layers joined together along first and second longitudinal edges is prefabricated at a first location by forming longitudinally spaced, transversely extending rows of perforations across it and sealing it together along seal lines which extend from the first edge of the material in a direction generally parallel to the rows of perforations other and terminate a short distance from the second edge to form chambers with open mouths facing the second edge between the rows of perforations. The material is then fan-folded or formed into rolls for storage and shipment. At a second location, gas is introduced into the chambers by passing the material along a tube positioned between the ends of the seals and the second edge of the material and injecting the gas into the open mouths of the chambers through openings in a side wall of the tube. The two layers are then sealed together across the open mouths to close the chambers and retain the gas in them.

11 Claims, 12 Drawing Sheets

U.S. PATENT DOCUMENTS

| | | | |
|---|---|---|---|
| 5,454,642 A | | 10/1995 | De Luca |
| 5,535,888 A | | 7/1996 | De Luca |
| 5,552,003 A | | 9/1996 | Hoover et al. |
| 5,581,983 A | | 12/1996 | Murakami |
| 5,604,016 A | | 2/1997 | Allegre |
| 5,651,237 A | | 7/1997 | De Luca |
| 5,658,632 A | | 8/1997 | Krabill |
| 5,692,833 A | | 12/1997 | De Luca |
| 5,693,163 A | | 12/1997 | Hoover et al. |
| 5,715,647 A | * | 2/1998 | Keim et al. ................. 53/374.5 |
| 5,824,392 A | | 10/1998 | Gotoh et al. |
| 5,858,153 A | | 1/1999 | Mack |
| 5,873,215 A | | 2/1999 | Aquarius et al. |
| 5,942,076 A | * | 8/1999 | Salerno et al. ............... 156/359 |
| RE36,501 E | | 1/2000 | Hoover et al. |
| 6,015,047 A | | 1/2000 | Greenland |
| 6,209,286 B1 | | 4/2001 | Perkins et al. |

FOREIGN PATENT DOCUMENTS

| | | |
|---|---|---|
| EP | 0836926 | 4/1998 |
| FR | 2389547 | 12/1978 |
| FR | 2580597 | 10/1986 |
| GB | 2218401 | 11/1989 |
| JP | 07016961 | 1/1995 |
| JP | 07165267 | 6/1995 |
| WO | 94 07678 | 4/1994 |
| WO | 98 40276 | 9/1998 |

* cited by examiner

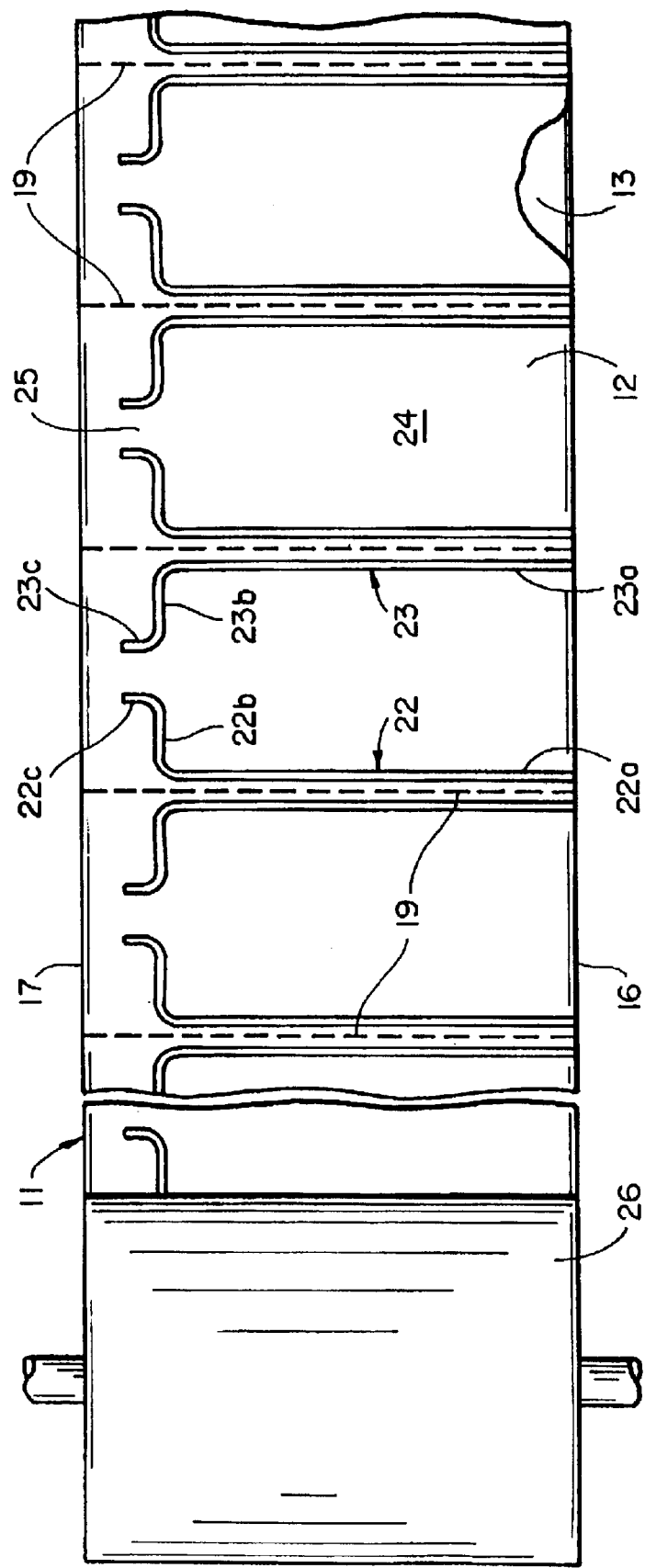
FIG_1

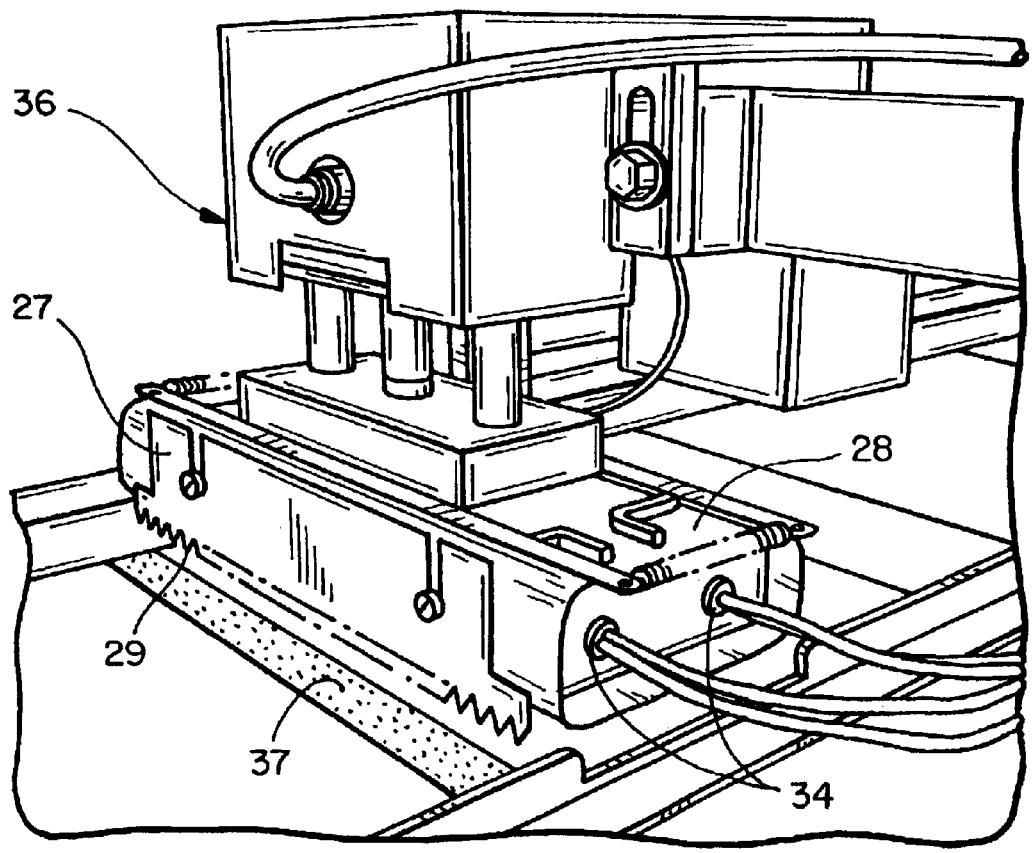
FIG_2
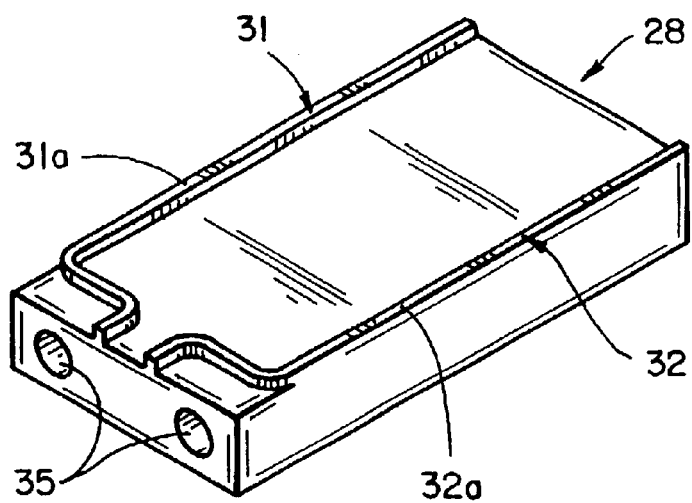
FIG_3

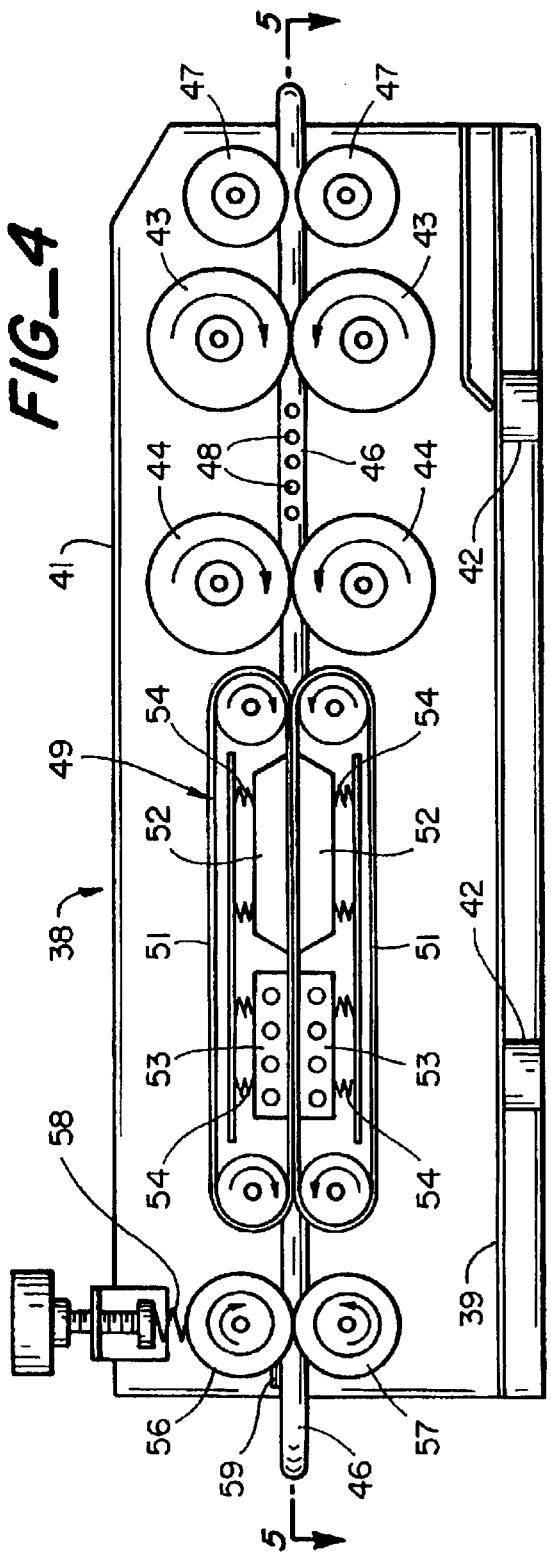
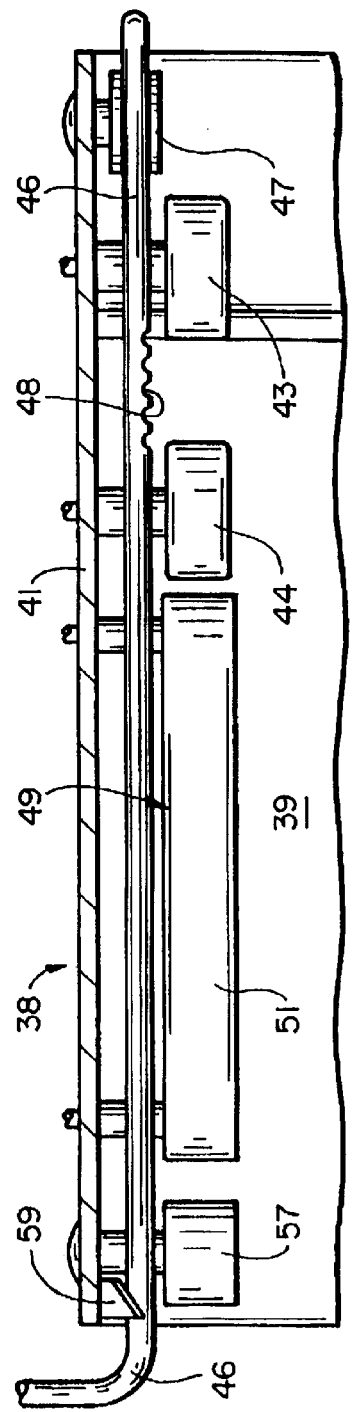

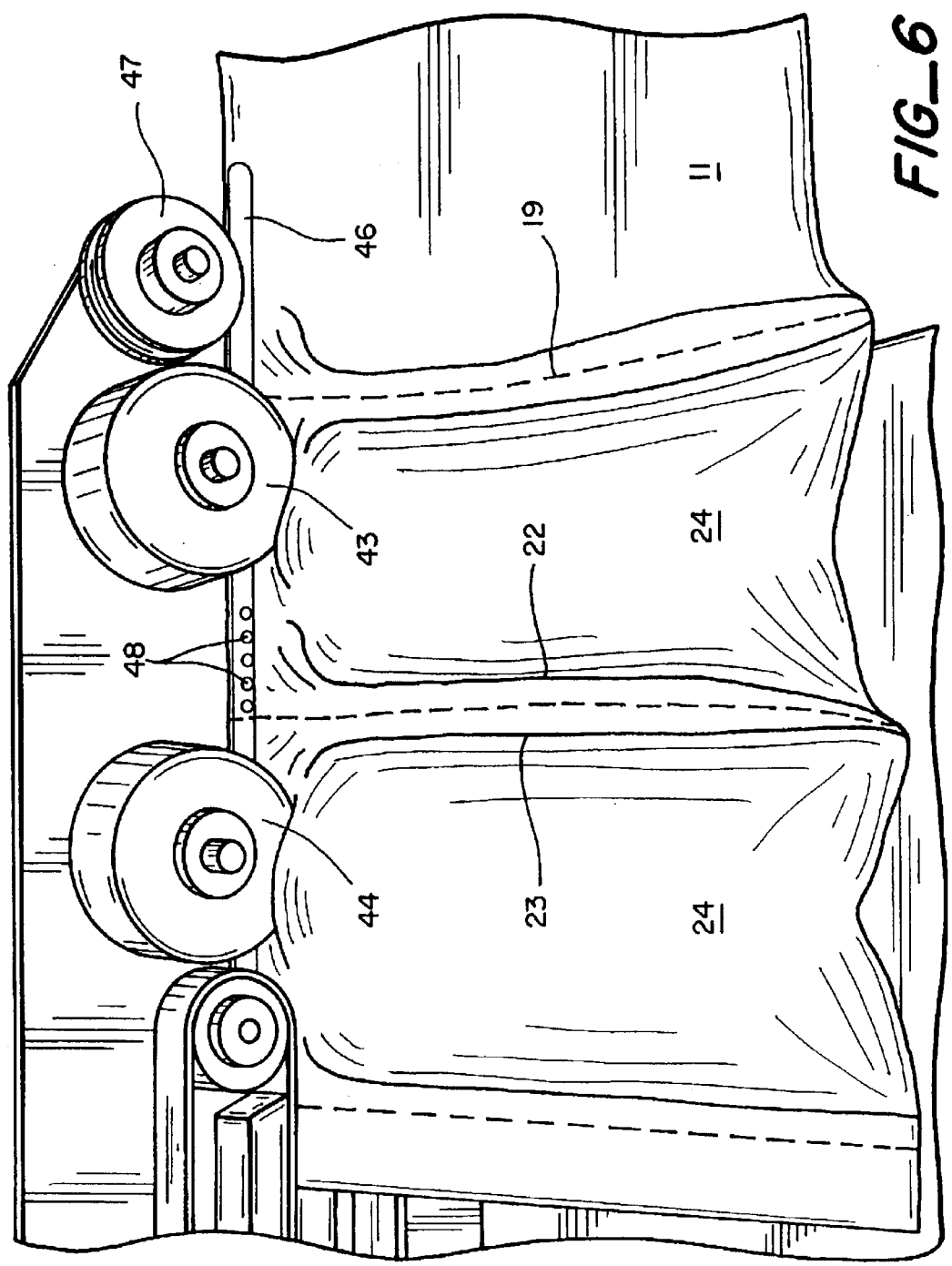

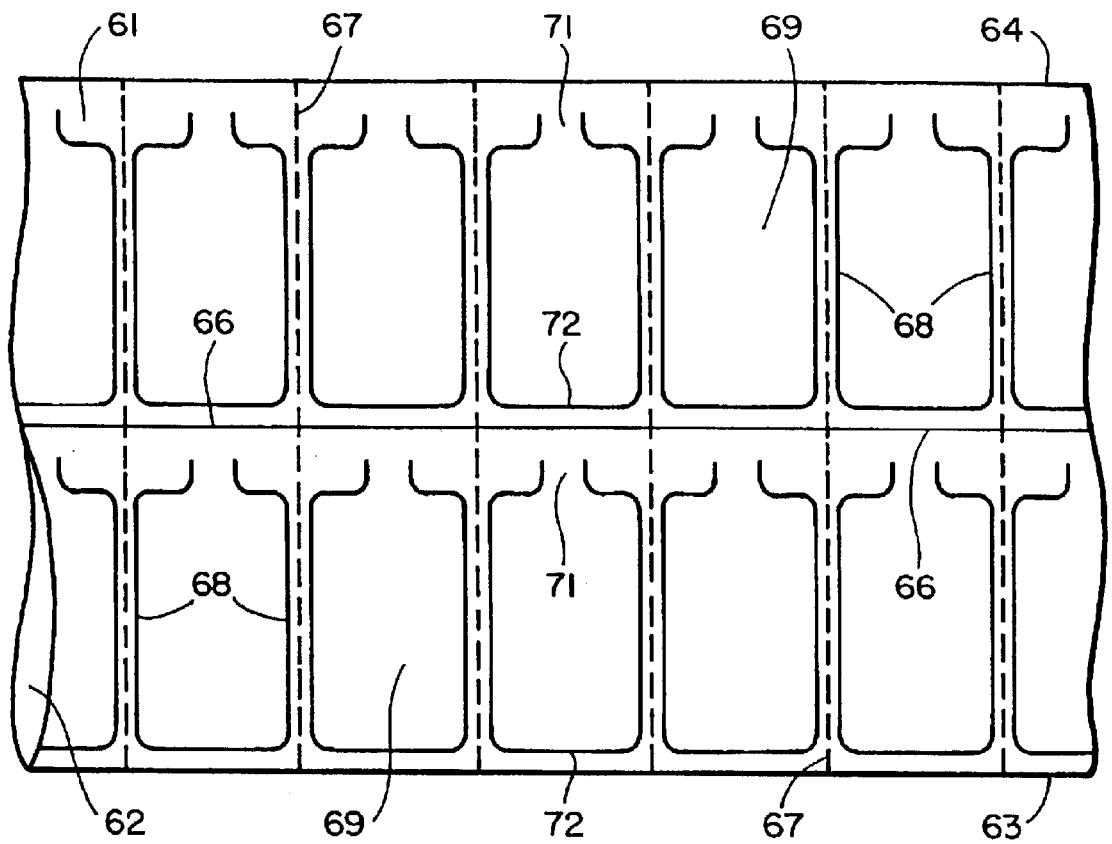
FIG_7
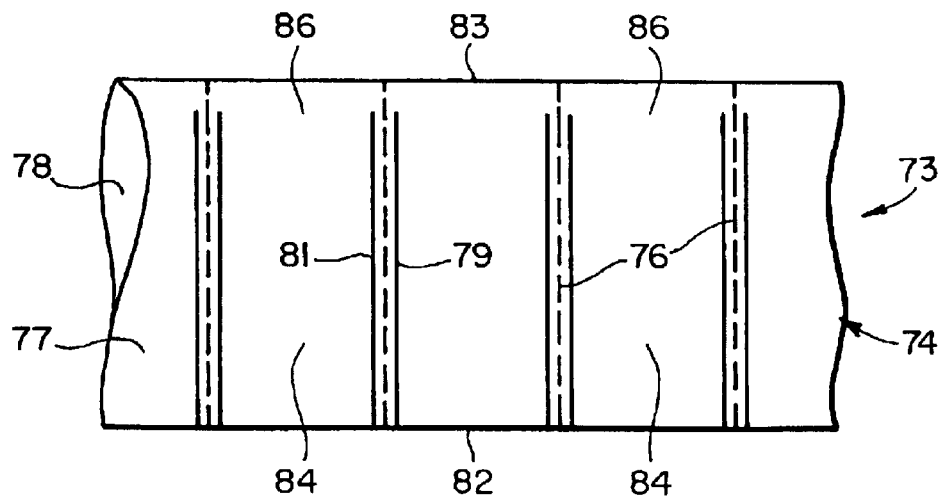
FIG_8

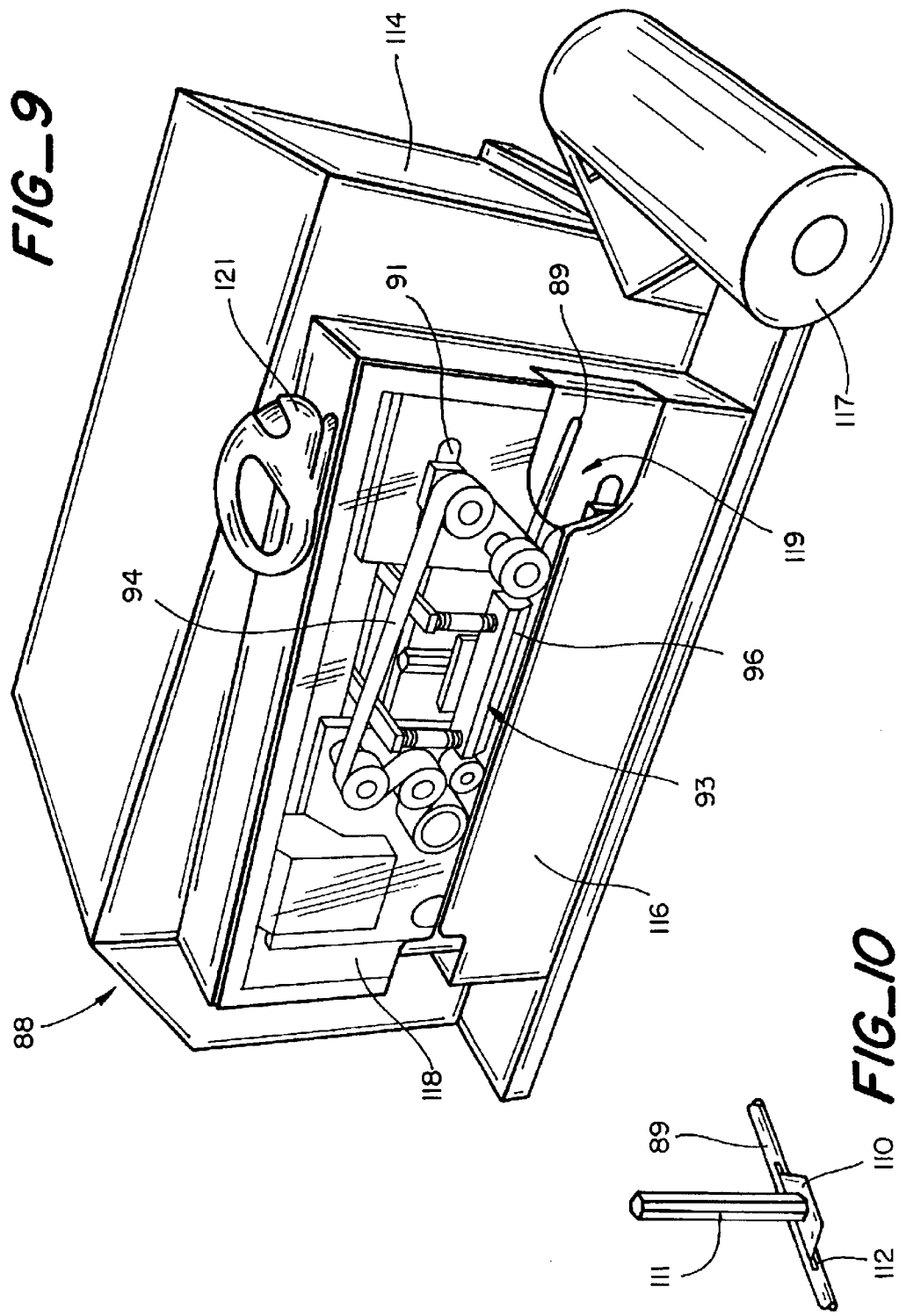

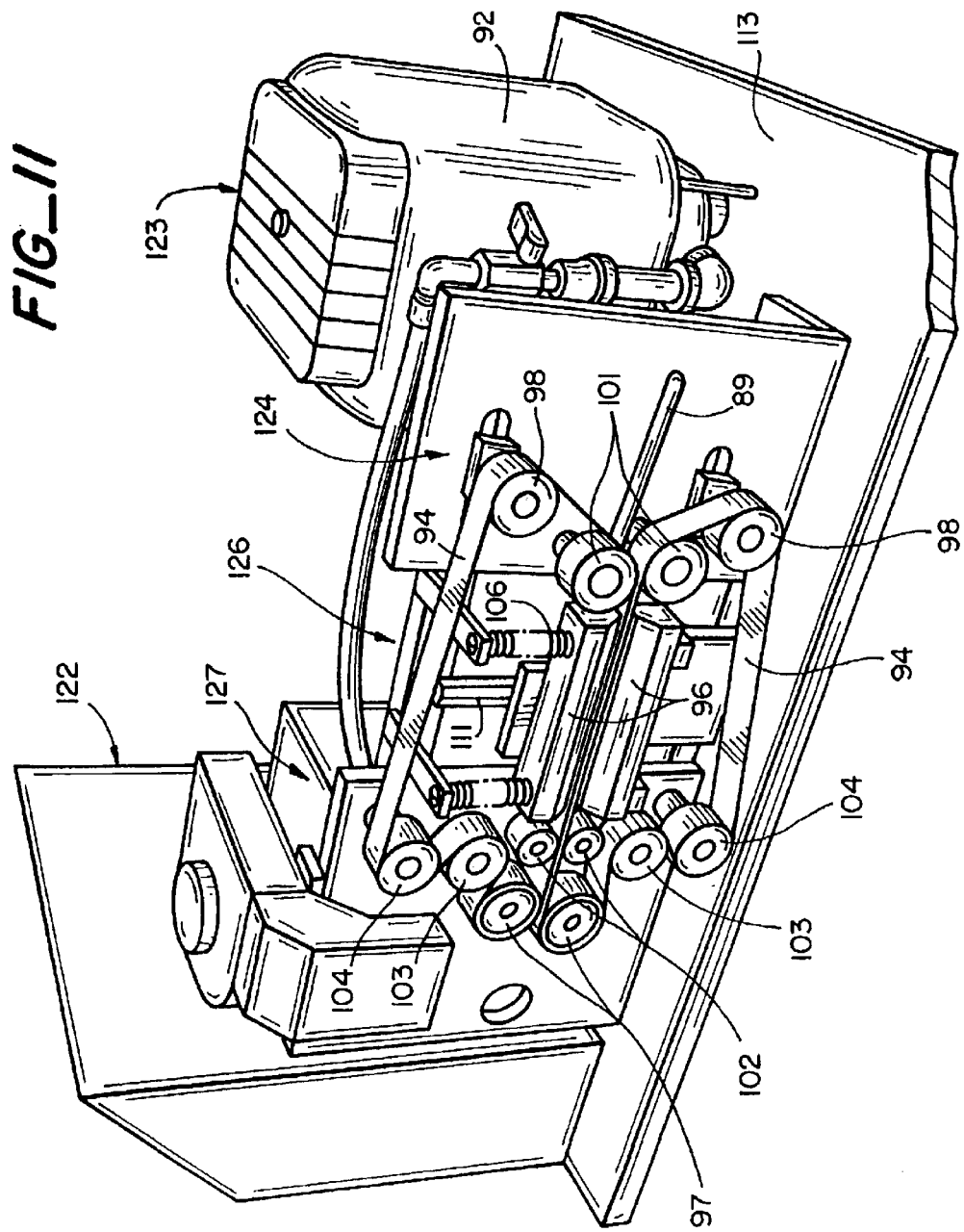
FIG_11

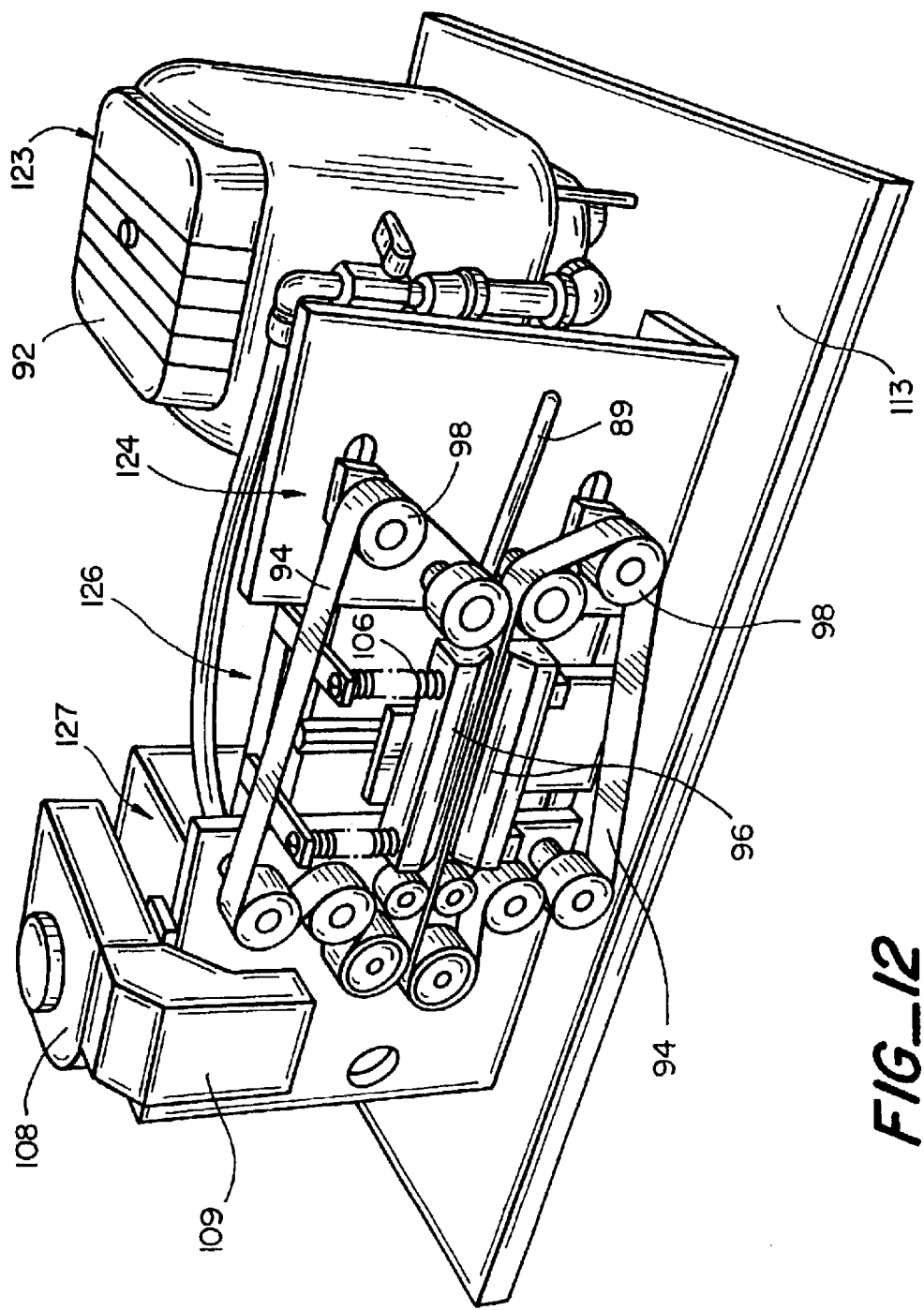
FIG_12

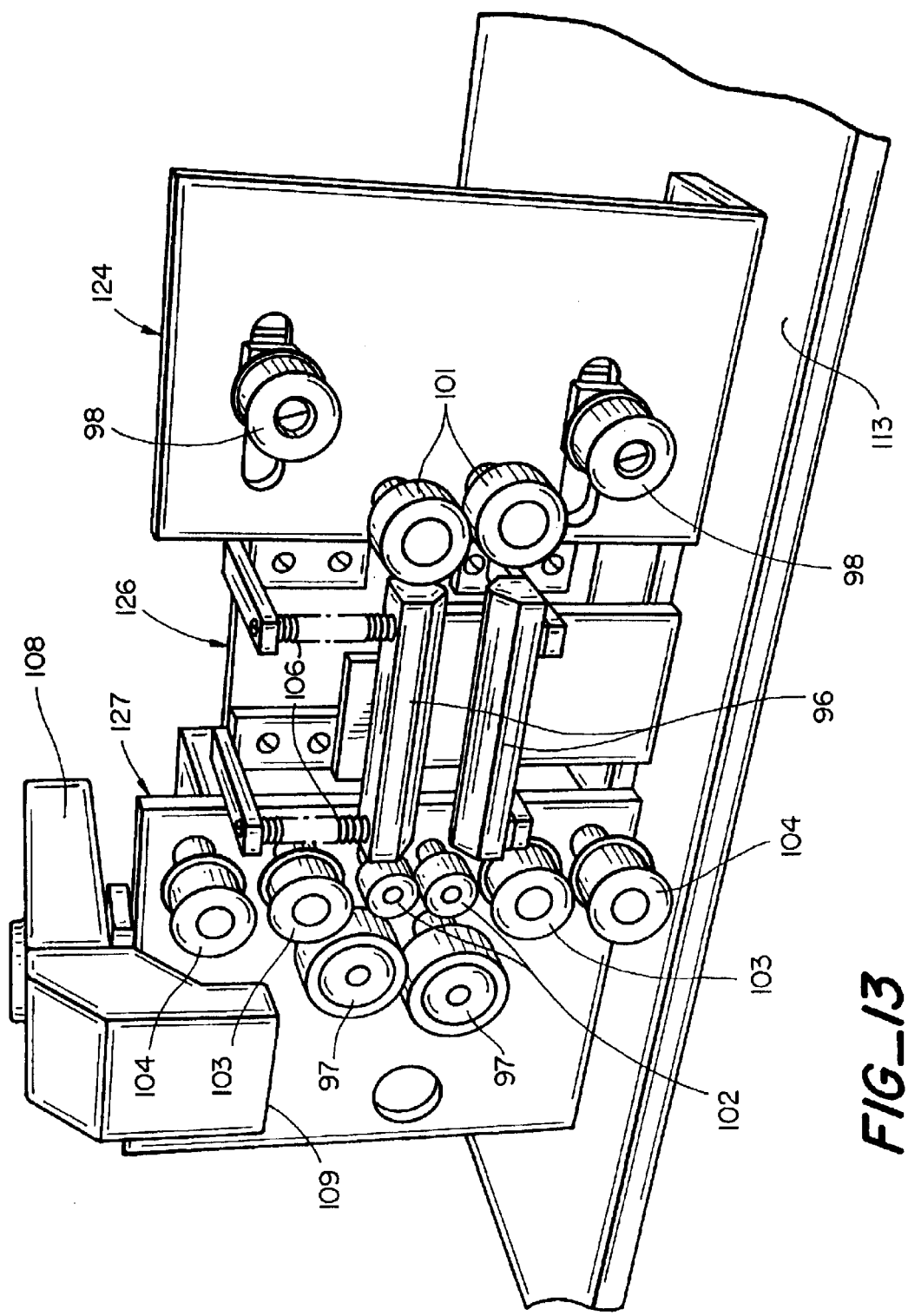
FIG_13

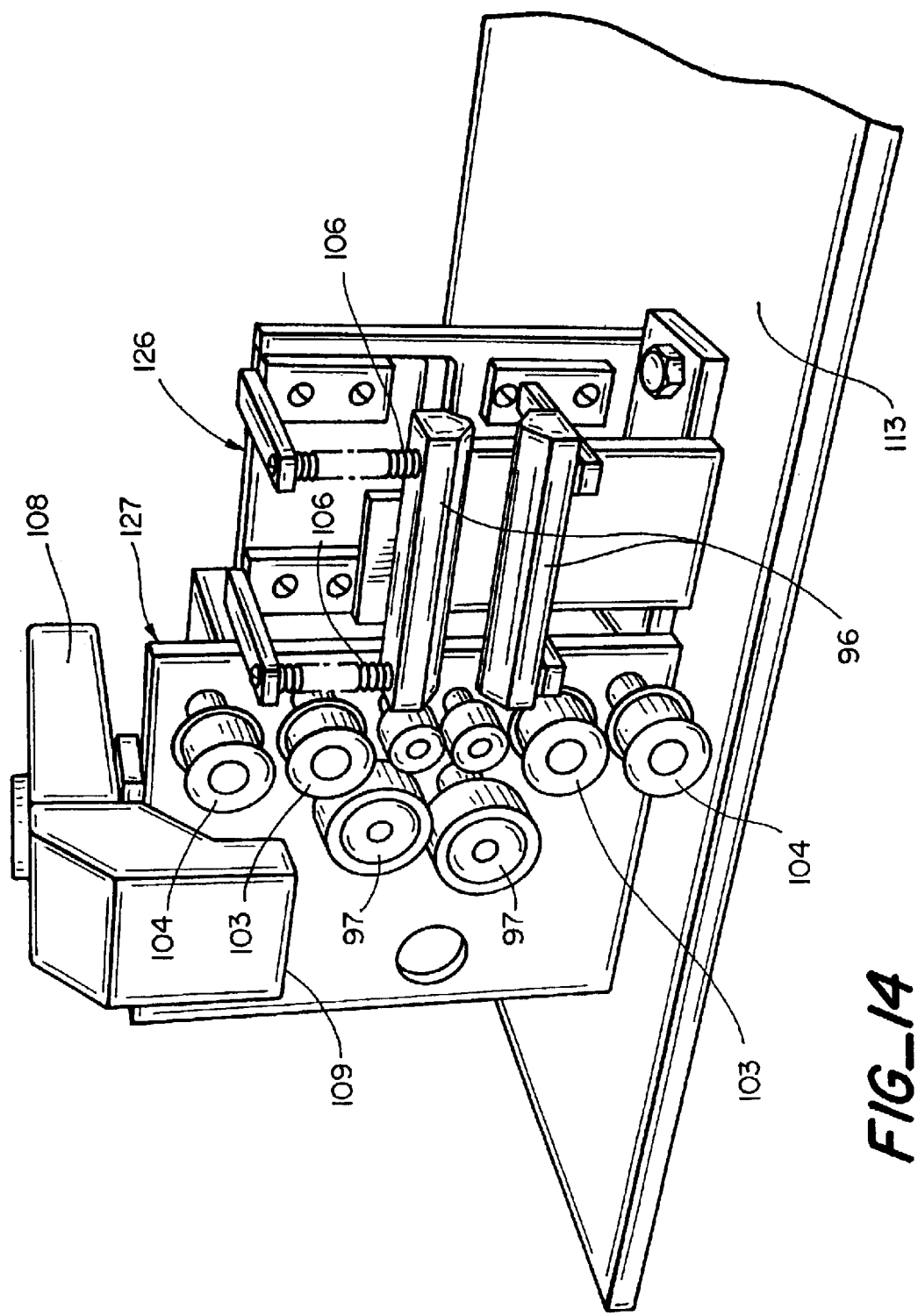
FIG_14

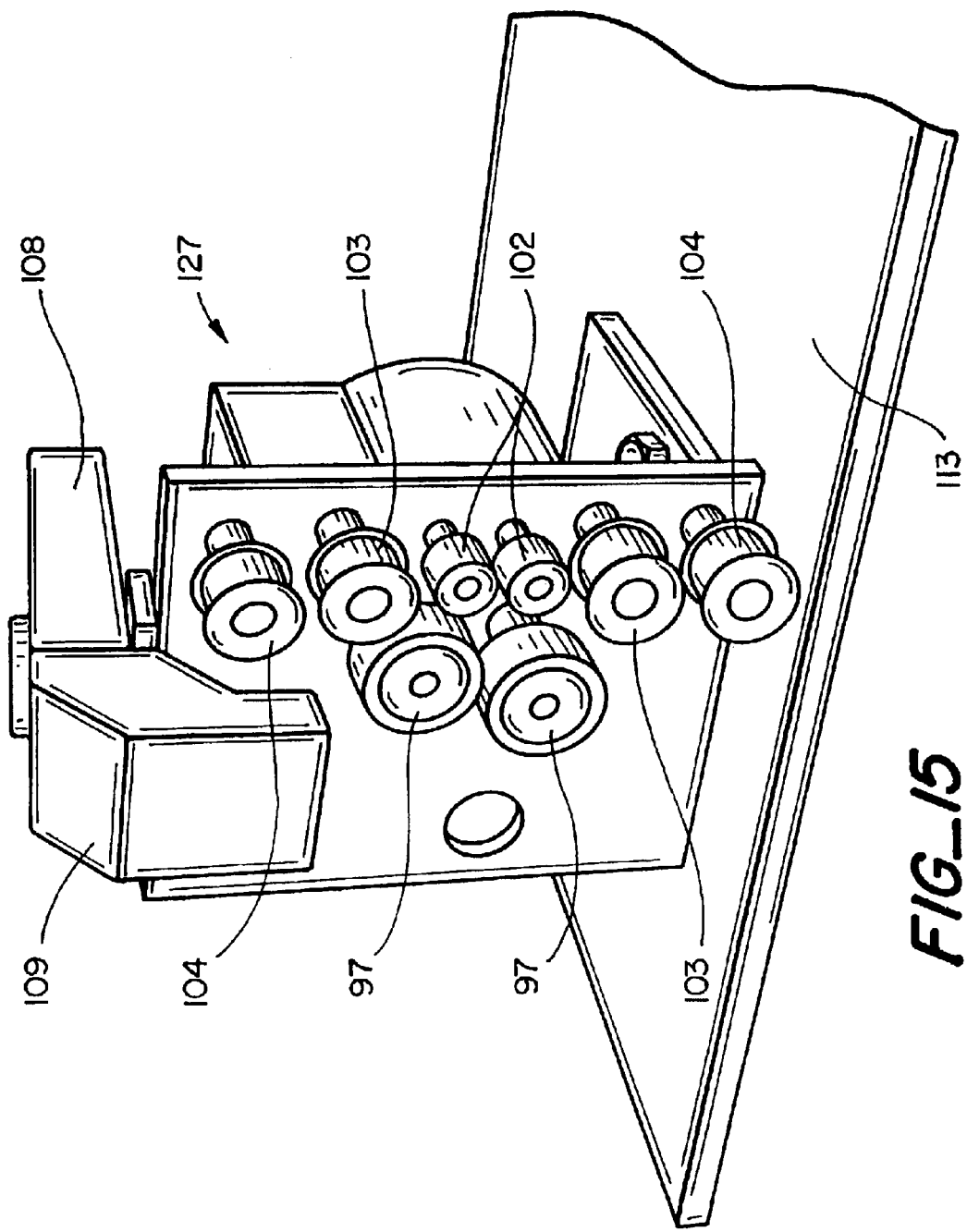

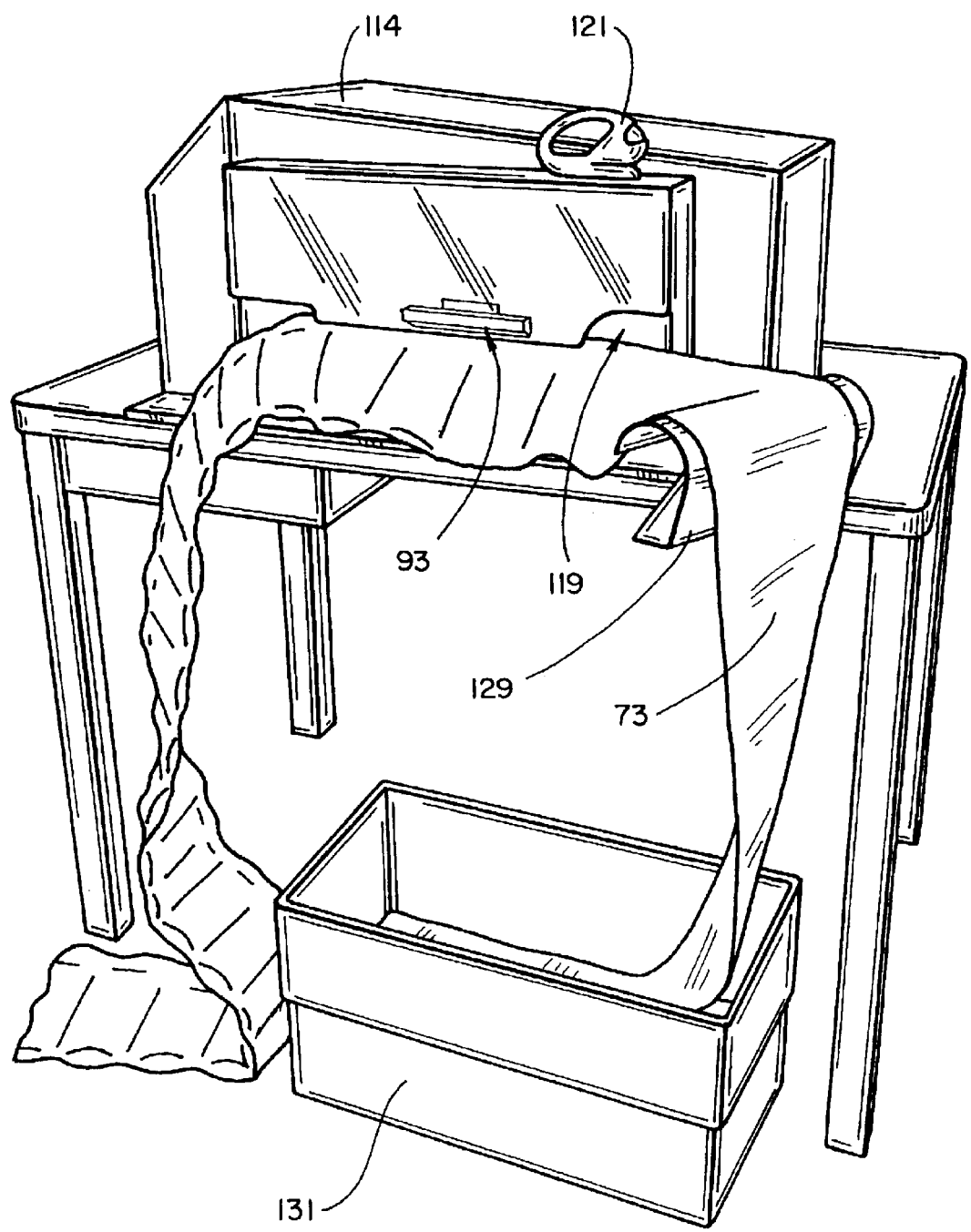
FIG_16

SYSTEM, METHOD AND MATERIAL FOR MAKING PNEUMATICALLY FILLED PACKING CUSHIONS

BACKGROUND

1. Field of the Invention

This is a division of Ser. No. 09/765,064, filed Jan. 17, 2001, now U.S. Pat. No. 6,582,800 and is a continuation-in-part of Ser. No. 09/488,622, filed Jan. 20, 2000, now abandoned.

2. Description of Prior Art

This invention pertains generally to packing materials and, more particularly, to a system, method and material for making pneumatically filled packing cushions.

In order to reduce the amount of space required for shipment and storage, these air filled cushions are generally made at or near the point of use. Forming the perforations and seals and filling the cushions requires relatively complicated and expensive machines, and also requires a packer or shipper to undertake a more substantial manufacturing operation than he may want to.

Heretofore, there have been some attempts to reduce the complexity and cost of the machine which the packer or shipper must have by forming the perforations and some of the seals in the film material before it is shipped to him. Examples of such prefabricated materials are found in Ser. No. 09/488,621, filed Jan. 20, 2000. While those materials do permit simpler and less expensive machines to be used, there are still problems of getting the air into the cushions and getting the material sealed without losing the air so that the cushions will be inflated in a uniform and controllable manner.

OBJECTS AND SUMMARY OF THE INVENTION

It is in general an object of the invention to provide a new and improved system, method and material for making pneumatically filled packing cushions.

Another object of the invention is to provide a system, method and material of the above character which overcomes the limitations and disadvantages of the prior art.

These and other objects are achieved in accordance with the invention by providing a system, method and material for making pneumatically filled packing cushions in which a plastic film material having two superposed layers joined together along first and second longitudinal edges is processed at a first location by forming longitudinally spaced, transversely extending rows of perforations across it and sealing the two layers together along seal lines which extend from the first edge of the material in a direction generally parallel to the rows of perforations and terminate a short distance from the second edge of the material to form chambers with open mouths facing the second edge between the rows of perforations. The material is then fan-folded or formed into rolls for storage and shipment.

At a second location, gas is introduced into the chambers by passing the material along a tube positioned between the ends of the seals and the second edge of the material and injecting the gas into the open mouths of the chambers through openings in a side wall of the tube. The two layers are then sealed together across the open mouths to close the chambers and retain the gas in them.

BRIEF DESCRIPTION OF THE DRAWINGS

FIG. 1 is top plan view, partly broken away, of one embodiment of a material for use in making pneumatically filled packing cushions in accordance with the invention.

FIG. 2 is an isometric view of one embodiment of a machine for making the material of FIG. 1.

FIG. 3 is an isometric view of the underside of the platen or die used in the machine of FIG. 2.

FIG. 4 is side elevational view of one embodiment of a machine for making packing cushions in accordance with the invention.

FIG. 5 is a cross-sectional view taken along line 5—5 in FIG. 4.

FIG. 6 is an operational view of the embodiment of FIG. 4.

FIGS. 7 and 8 are fragmentary top plan views, partly broken away, of other embodiments of material for use in making pneumatically filled packing cushions in accordance with the invention.

FIG. 9 is an isometric view of another embodiment of a machine for making packing cushions in accordance with the invention.

FIG. 10 is a fragmentary, isometric view of the knife for slitting the film material for separation from the inflation tube in the embodiment of FIG. 9.

FIG. 11 is an isometric view similar to FIG. 9 with the covers removed from the machine.

FIGS. 12–15 are isometric views of the embodiment of FIG. 9 with the covers and different modules removed from the machine.

FIG. 16 is an isometric view of another embodiment of a machine for making packing cushions in accordance with the invention.

DETAILED DESCRIPTION

As illustrated in FIG. 1, the material for making the pneumatically inflated cushions consists of an elongated length of flattened plastic tubing 11 having an upper layer 12 and a lower layer 13. The material can be any suitable plastic film, such as high density polyethylene. This material is joined together, or closed, along its two longitudinal edges 16, 17.

Transversely extending rows of perforations 19 are formed across the tubing at longitudinally spaced intervals along the length of the tubing. These perforations separate adjacent ones of the cushions and provide means for tearing the cushions apart.

Between each of the rows of perforations, the two layers of film material are sealed together along a pair of lines 22, 23 which define chambers 24 which are ultimately filled with air or other suitable gas to form the cushions. Each of the seal lines includes a relatively long first segment 22a, 23a which extends from edge 16 in a direction generally parallel to the rows of perforations and in proximity to the them. The length of those segments is on the order of 85 to 90 percent of the width of the material. As the lines approach edge 17, they turn toward each other with longitudinally extending segments 22b, 23b which have a length equal to about one-third of the distance between the rows of perforations. The lines then turn toward edge 17 again with segments 22c, 23c which terminate a short distance from that edge. The corners between the different segments are rounded, and the chambers defined by these lines have a shape similar to a conventional hot water bottle, with a relatively narrow open mouth 25 facing toward edge 17.

In one embodiment made from plastic tubing having a flattened width of 9 inches, the rows of perforations are spaced about 4⅜ inches apart, the seal lines are about ⅛ inch wide, segments 22*a*, 23*a* are spaced about ⅛ inch from the perforations, and the mouths of the chambers are about ¾ inch wide and spaced about 7/16 inch from the edge of the material.

After the perforations and the seals are formed, the material is wound onto a roll 26 for shipment and storage.

In the system shown in FIG. 2, perforations 19 and seals 22, 23 are formed by a knife 27 and a heated die or platen 28. The knife has a plurality of triangular teeth 29 which cut the perforations, and the platen has die elements 31, 32 on its under face for heating the material to form the seals. In this particular embodiment, the platen is wider than the material, and the long segments 31*a*, 32*a* of the die elements extend beyond the edge 16 of the material, with that edge closing off the ends of the chambers. Alternatively, if desired, the platen can be made narrower than the material, with an additional die segment for sealing the material along a line spaced in a short distance from edge 16 to close that end of the chambers.

The platen has a body of metal or other suitable heat conductive material, and is heated by a electric heaters 34 mounted in bores 35 in the body.

The knife is mounted in a fixed position on one side of platen, and can be insulated from the platen by ceramic spacers (not shown) to reduce heat transfer to the knife. The platen and knife are mounted on the reciprocating head of a machine 36 for engagement with the film material as the material is fed beneath the head. A brush 37 is mounted on the bed of the machine beneath the knife for supporting the film material as the perforations are cut.

Although only one platen and one knife are employed in this particular machine, it is contemplated that machines for making the material will have a plurality of platens and knives for forming the seal lines and perforations for a plurality of cushions on each stroke. Alternatively, if desired, the seals can be formed with a rotary die having one or more die elements spaced around its circumference, with knives between them.

At the location where the cushions are to be completed and used, a machine 38 is provided for injecting air or another suitable gas into chambers 24 through the open mouths 25, then sealing the mouths shut to confine the gas within the chambers.

As illustrated in FIGS. 4 and 5, the machine has a horizontally extending bed 39 on which the material rests as it passes through the machine. It also has a frame in the form of an upstanding plate 41 at the rear of the bed, with feet 42 supporting the bed toward the front. Two pairs of feed rollers 43, 44 are mounted on the plate for drawing the material from rolls 26 and feeding it through the machine. The feed rollers engage the material a short distance in from edge 17. Since the machine engages only the one edge portion of the material, it can accommodate materials of different widths. As discussed more fully hereinafter, rollers 44 turn slightly slower than rollers 43 so that the mouths of the chambers tend to open up, rather than being drawn taut, as they pass between the rollers.

An inflation tube 46 extends longitudinally near frame plate 41 in the path of the material passing through the machine. One end of the tube is connected to a source of air or other suitable gas (not shown), and the other end is supported loosely between a pair of grooved rollers 47 which are rotatively mounted on the base plate. A plurality of openings 48 are provided in the side wall of the tube between the feed rollers for injecting the air or other gas into the chambers. As the material is fed into the machine, the free end of the inflation tube enters the passageway between the ends of seals 22, 23 and the edge 17 of the material. The tube thus serves as a guide for the material as well as the means for inflating the cushions. The fit between the guide rollers and the tube is such that the material can pass freely between them, but the rollers still provide support for the free end of the tube.

The air or gas is introduced at a pressure on the order of 3 psi, which can be provided by a small pump (not shown), or if the machine is pneumatically operated, it can be derived from the compressed air source for the machine.

Means is provided for sealing the open mouths of the chambers after the air has been introduced. In the embodiment illustrated, this means comprises a belt sealer 49 which has a pair traveling belts 51 that carry the film material past heater blocks 52 positioned on opposite sides of the material. In one present embodiment, belts are made of Teflon®, which can withstand the heat and transfer it from the blocks to the film material. The sealer also has a pair of cooling blocks 53 positioned downstream of the heater blocks. The heater blocks and cooling blocks are urged together by springs 54, which ensures good contact between the blocks and the belts and between the belts and the film material.

A knurling wheel 56 is provided for knurling the warm material leaving the sealer. This wheel is rotatively driven and is urged against an idler wheel 57 by a spring 58.

A knife 59 is mounted on the base plate after the knurling wheel for slitting the material along edge 17 so it can pass over the inflation tube which turns rearwardly at that point.

The drive mechanism is located behind plate 41 and is of conventional design. It is omitted from the drawings for ease and clarity of illustration.

Operation and use of the system, and therein the method of the invention are as follows. The film material is perforated and sealed at one location to form the chambers with the relatively narrow open mouths, then wound onto rolls for shipment and storage. At the location where the cushions are to be completed and used, the material is drawn from a roll by feed rollers 43, 44 and fed along inflation tube 46. With rollers 44 turning slightly slower than rollers 43, the mouths of the chambers tend to open up as they pass between the rollers, and the air or gas is injected into the chambers 24 through the open mouths from the openings 48 in the inflation tube.

Immediately after the air or gas is injected, the mouths of the chambers are sealed shut by the sealing unit 49 and knurling wheel 56. Because of the relatively narrow mouths, little if any air escapes from the chambers before they are sealed, and the resulting cushions therefore tend to be filled quite uniformly. As the material leaves the machine, it is slit along edge 17 by knife 59 to free it from the inflation tube.

FIG. 6 shows the material 11 being fed into the machine, with air being injected into chambers 24 and the cushions advancing to the sealer after the chambers have been filled.

FIG. 7 illustrates an embodiment in which a wider film material is prepared for use in making two strings of cushions. In this embodiment, two layers of material 61, 62 are joined together along their edges 63, 64, and a slit seal 66 is formed down the center of the material. Transverse rows of perforations 67 are formed across the entire width of the material, and seals 68 are formed on either side of the slit seal to define the chambers 69 for the cushions.

As in the embodiment of FIG. 1, the chambers have relatively narrow open mouths 71, but seals 68 differ from the seals 22, 23 in that they extend across the lower edges 72 of the chambers instead of running off the edge of the material.

In use, the two halves of the material are separated and fed though a machine which injects the air and seals the chambers in the manner described above with regard to the material of FIG. 1. If desired, the two halves can be wound onto a single roll and separated at the point of use, or they can be separated at the point of manufacture and wound onto separate rolls.

In the embodiment of FIG. 8, the material 73 once again comprises an elongated length of flattened plastic tubing 74, with rows of perforations 76 extending transversely across the tubing from one edge to the other.

Between the rows of perforations, the two layers 77, 78 of the flattened tubing are sealed together along straight lines 79, 81. These seals extend transversely from one edge 82 of the tubing toward the other and terminate a short distance from the second edge 83. Each pair of seal lines 79, 81 defines an air chamber 84 which has an open mouth 86 near the second edge.

The dimensions of the tubing and the spacing of the perforations and seal lines determine the size of the cushions which will be made from the material. In one embodiment which is suitable for use in many shipping cartons, the tubing has a flattened width of about 8 inches, the rows of perforations are spaced about 4 inches apart, and the seal lines are about 1/8 inch wide, spaced about 3¼ inches apart, and terminate about ½ inch from the second edge of the tubing.

For storage and shipment, the material can be wound into rolls as in the embodiment of FIG. 1, or it can be fan-folded and kept in rectangular boxes. The material can either be folded directly into the boxes, or it can placed in the boxes after it is folded. The rectangular boxes can be stacked more efficiently than circular rolls, and fan-folding eliminates the need for cores for the material to be wound on. The fan-folded material has additional advantages in that the material can be dispensed directly from the boxes, and does not need to lifted onto a spindle like rolls do. In many instances, the boxes can simply be left on the floor beneath the machine which processes the material into finished cushions. Also, with the fan-folded material, there is no need for brakes or other means for controlling the inertia of rolls as the material is drawn into the machine.

FIGS. 9–15 illustrate a compact, table-top machine 88 for finishing the cushions from the prefabricated film material of FIG. 8. This machine is generally similar to the embodiment of FIGS. 4–6, and it has an inflation tube 89 which passes between the ends of seals 79, 81 and the edge 83 of the material. The tube has three openings 91 in its side wall for injecting air or other gas through the open mouths of the chambers. In the embodiment illustrated, air is supplied to the inflation tube at a pressure on the order of 3 psi by a pump 92.

The inflation tube is arcuately curved in a horizontal plane so that the film material will follow an arcuate path as it passes through the machine. This has been found to be advantageous in accommodating the changes in shape which occur in the film as the cushions are inflated.

A belt sealer 93 seals the mouths of the chambers immediately after the air is introduced into them. As in the embodiment of FIGS. 4–6, the sealer has a pair of traveling belts 94 positioned on opposite sides of the film material, with heater blocks 96 for applying heat to the material through the belts. In this embodiment, however, there are no feed rollers, and the sealer belts feed the material through the machine. The belts are trained about drive rollers 97, take-up rollers 98 and guide rollers 101–104.

The heater blocks are movable between a rest position away from the belts and a sealing position against the belts. They are urged together toward the sealing position by springs 106, and they are moved apart by a cam mechanism (not shown).

The film material leaving the heat sealer is cooled by air from a "muffin" fan 108 through a short duct 109 that directs the air down onto the film material. The knife blade 110 for slitting the edge of the film material for separation from the inflation tube is mounted on a holder 111 and positioned at the center of the heaters, with the cutting edge of the blade extending into a shallow slot 112 in the back side of the tube. Having the blade in this location has been found to make it easier for the film material to leave the tube, and it also permits the material to follow the arcuate path which accommodates the changes in the shape of the material as the cushions are inflated.

Operation of the machine is controlled by a programmable logic unit (PLU) and a footswitch (not shown). In the rest position, the drive motors for the sealer belts and the cam mechanism for the heating blocks, the air pump and the cooling fan are all turned off. Depressing the footswitch turns on the air pump and the fan, followed by the drive motors. When the drive motors are actuated, the heating blocks press against the belts, and the belts feed the film material through the machine. Operation of the motors is delayed just enough to allow the first cushion to fill to the proper level before it is sealed. Depressing the footswitch again stops the machine, turning off the drive motors, the pump and the fan. The temperature of the heaters is also controlled by the programmable logic unit.

The machine is constructed in modular form on a base plate 113 which is adapted to rest on a table top or bench. It has an enclosure comprising an upper cover 114 and a lower cover 116, with a holder 117 for a roll of film material 73 affixed to the enclosure. The upper cover has a transparent plastic window 118 which terminates a short distance above the upper edge of the lower cover to provide an opening through which the film material passes. The window and the lower cover serve as a shield to keep the material away from the sides of the heater blocks. An opening 119 is formed in the lower corner of the window and the upper corner of the lower cover to facilitate insertion of the inflation tube into the film material as the material is inserted into the machine. A knife 121 is mounted on the upper cover for trimming the corner off the material to further facilitate insertion of the tube.

The modules which make up the machine include a control module 122, a pump module 123, a take-up module 124, a heater module 126, and a drive module 127. In FIG. 11, the machine is illustrated with the covers removed and all of the modules in place. In FIG. 12, the control module is removed, but the other four modules are still in place. In FIG. 13, the control module and the pump module are removed, leaving the take-up module, the heater module and the drive module. In FIG. 14, the take-up module is also removed, and only the heater and drive modules are left. In FIG. 15, all but the drive module are removed. With this modular construction, repairs and replacements are easily made by removing and replacing only the affected module.

The embodiment of FIG. 16 is similar to the embodiment of FIGS. 9–15 except that it has a guide 129 for the prefabricated film material instead of the roll holder. The guide is set at a non-perpendicular angle to the front of the machine to facilitate travel of the material along an arcuate path through the machine. In this embodiment, the film material 73 is fan-folded and is fed to the machine from a box 131 resting on the floor below the machine. Although the box is illustrated as being generally parallel to the path of travel through the machine, that orientation is not critical, and the box can be placed at any convenient angle, including perpendicular to the machine.

The invention has a number of important features and advantages. By supplying the material with the perforations and the major portions of the seals already formed, the cushions can be manufactured at the point of use with a relatively uncomplicated and inexpensive machine. Since the open mouths of the chambers are relatively narrow, the cushions can be sealed relatively easily and without appreciable loss of the gas which has been injected into them. This results in cushions which are inflated more uniformly than cushions of the prior art.

It is apparent from the foregoing that a new and improved system, method and material for making pneumatically filled packing cushions have been provided. While only certain presently preferred embodiments have been described in detail, as will be apparent to those familiar with the art, certain changes and modifications can be made without departing from the scope of the invention as defined by the following claims.

What is claimed is:

1. A machine for making air-filled packing cushions from a preconfigured plastic film material with two elongated superposed layers joined together to form a longitudinally extending inflation channel near one edge of the material and a plurality of cushion chambers to one side of and in fluid communication with the inflation channel, comprising: a base adapted to rest upon a bench or table, a housing which extends upwardly from a rear portion of the base and defines a longitudinally extending opening through which an edge portion of the film material can pass, a guide extending in a forward direction from the housing at one end of the base for supporting the film material, a feed roller extending into the opening for engaging the edge portion of the material and feeding the material along a path with the edge portion of the material passing through the opening, an air injector positioned toward the rear of the opening for injecting air into the inflation channel and the cushion chambers, and a sealing unit engagable with the film material within the opening for forming a longitudinally extending seal adjacent to the inflation channel to close the chambers and retain the air therein.

2. The machine of claim 1 wherein the air injector comprises an elongated inflation tube which extends longitudinally of the opening and is adapted to be received in the inflation channel as the edge portion of the material passes through the opening.

3. The machine of claim 2 including a knife blade positioned for slitting the material along the inflation channel to release the material from the inflation tube after the air has been injected into the chambers.

4. A machine for making air-filled packing cushions from a preconfigured plastic film material with two elongated superposed layers joined together along transversely extending seal lines to form a plurality of cushion chambers with open mouths facing toward one edge of the material, comprising: a housing having an upstanding wall, a cover on the outer side of the wall with an opening defining a path along which an edge portion of the material can travel, a feed mechanism positioned between the wall and the cover for engaging the edge portion of the material and feeding the material through the machine, an air injector positioned behind the cover for introducing air into the chambers through the open mouths as the material passes through the machine, and a sealer positioned between the wall and the cover for sealing the two layers of material together across the mouths of the chambers after the air has been introduced into the chambers.

5. The machine of claim 4 wherein the path defined by the opening extends in a generally horizontal direction.

6. The machine of claim 4 wherein the cover has two separately removable sections, and the opening is formed between the two sections.

7. The machine of claim 4 wherein the feed mechanism includes a drive belt which engages the edge portion of the material.

8. The machine of claim 4 wherein the air injector comprises an elongated tube which is received in a longitudinally extending inflation channel in the edge portion of the material which communicates with the chambers through the open mouths.

9. The machine of claim 8 including a knife blade positioned for slitting the material along the inflation channel to release the material from the inflation tube alter the air has been introduced into the chambers.

10. The machine of claim 4 wherein the sealer includes means for forming a continuous, longitudinally extending seal across the mouths of the chambers.

11. The machine of claim 4 wherein the sealer includes a pair of sealing blocks disposed on opposite sides of the path, and a pair of belts which engage the film material and carry it past the sealing blocks, with heat being transferred to the film material from the sealing blocks through the belts.

* * * * *